(No Model.)
J. SUTTON.
REMOVABLE PLOW POINT.
No. 590,776. Patented Sept. 28, 1897.
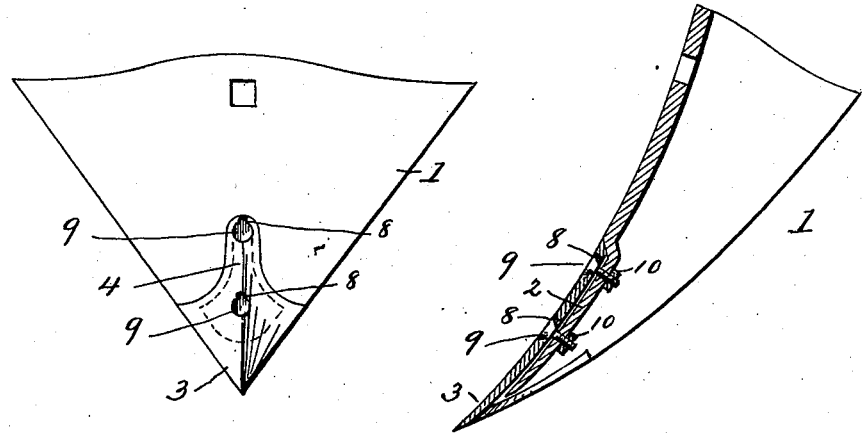
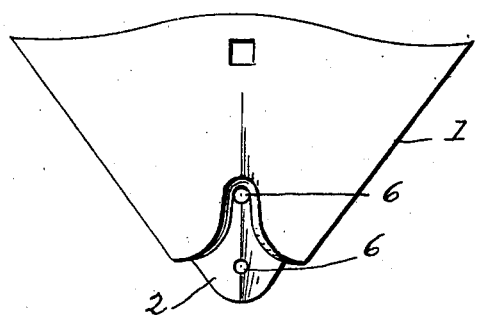
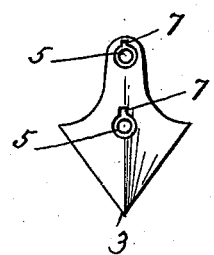
Witnesses
Saml R Turner
J. A. Willson
Inventor
James Sutton.
By H. B. Willson
Attorney

UNITED STATES PATENT OFFICE.

JAMES SUTTON, OF TUCKERMAN, ARKANSAS, ASSIGNOR OF ONE-HALF TO CRAWFORD WEST, OF SAME PLACE.

REMOVABLE PLOW-POINT.

SPECIFICATION forming part of Letters Patent No. 590,776, dated September 28, 1897.

Application filed May 3, 1897. Serial No. 634,832. (No model.)

*To all whom it may concern:*

Be it known that I, JAMES SUTTON, a citizen of the United States, residing at Tuckerman, in the county of Jackson and State of Arkansas, have invented certain new and useful Improvements in Removable Plow-Points; and I do declare the following to be a full, clear, and exact description of the invention, such as will enable others skilled in the art to which it appertains to make and use the same.

My invention has relation to plows; and the object of the invention is to provide a plow with a removable point, which when worn may be removed and replaced with a new one.

With this object in view the invention consists of certain features of construction and combination of parts which will be hereinafter fully set forth and claimed.

In the accompanying drawings, Figure 1 is a plan view of the shovel of a plow, illustrating the application of my invention. Fig. 2 is a longitudinal sectional view. Fig. 3 is a plan view of the shovel of a plow, the point being removed; and Fig. 4 is a plan view of the point.

In said drawings, 1 denotes a plow-shovel, the lower or working end of which is provided with a recess 2, the walls of which near its upper end taper.

3 denotes the plow-point, which may be of any suitable form or construction, and which is provided with a shank 4, tapering to correspond with the upper portion of the recess in the plow-shovel. This point and the shovel are provided with registering apertures 5 and 6, respectively. The apertures 5 are provided with slots 7 to receive ribs 8 upon the heads of the bolts 9 used for clamping the point to the shovel. This construction admits of the nuts 10 being more easily screwed upon the threaded ends of the bolts. Owing to the tapering recess and the correspondingly-tapering shank all undue strain is removed from the bolts, and this is an important feature, as the bolts heretofore employed were very apt to become bent or broken when the plow-point came in contact with an obstruction, such as a root, stump, or the like.

When the point has become damaged or worn, it may readily be removed and a new one quickly substituted, so that instead of buying a new plow all that a farmer has to do is to have a supply of points on hand.

Having thus described my invention, what I claim, and desire to secure by Letters Patent, is—

The combination with the shovel of a plow provided with a recess, the upper end of which tapers, of a plow-point having a correspondingly-tapered shank, said shovel and plow-point being provided with registering apertures, the apertures of the point having notches, bolts adapted to be passed through said apertures and provided with ribs adapted to said notches, and nuts screwed upon the ends of the bolt, substantially as set forth.

In testimony whereof I hereunto affix my signature in presence of two witnesses.

JAMES SUTTON.

Witnesses:
 W. R. STEEN,
 W. G. FRY.